(12) United States Patent
Hara et al.

(10) Patent No.: US 8,872,070 B2
(45) Date of Patent: Oct. 28, 2014

(54) OFFLINE TEACHING METHOD

(75) Inventors: Susumu Hara, Fujisawa (JP); Toshiyuki Izumi, Fujisawa (JP); Masatoshi Hida, Kobe (JP)

(73) Assignee: Kobe Steel, Ltd, Kobe-shi (JP)

( * ) Notice: Subject to any disclaimer, the term of this patent is extended or adjusted under 35 U.S.C. 154(b) by 624 days.

(21) Appl. No.: 13/185,823

(22) Filed: Jul. 19, 2011

(65) Prior Publication Data
US 2012/0031886 A1 Feb. 9, 2012

(30) Foreign Application Priority Data
Aug. 9, 2010 (JP) ................................. 2010-179052

(51) Int. Cl.
| | | |
|---|---|---|
| B23K 23/00 | (2006.01) | |
| B23K 9/095 | (2006.01) | |
| G05B 19/425 | (2006.01) | |
| B23K 9/10 | (2006.01) | |
| G05B 19/408 | (2006.01) | |
| B23K 9/12 | (2006.01) | |
| B23K 37/04 | (2006.01) | |

(52) U.S. Cl.
CPC ....... *B23K 9/124* (2013.01); *G05B 2219/36494* (2013.01); *B23K 9/095* (2013.01); *G05B 19/425* (2013.01); *B23K 9/1062* (2013.01); *G05B 19/4086* (2013.01); *G05B 2219/35091* (2013.01); *B23K 37/0452* (2013.01); *B23K 9/1087* (2013.01); *G05B 2219/36432* (2013.01)
USPC .................................................. 219/137 R

(58) Field of Classification Search
CPC .................. B23K 9/127–9/1278; B23K 9/032; G05B 2219/45104; G05B 10/423–10/427
USPC .............................................. 219/136, 137 R
See application file for complete search history.

(56) References Cited

U.S. PATENT DOCUMENTS

| | | | |
|---|---|---|---|
| 4,014,495 A * | 3/1977 | Oda et al. ........................... 228/7 |
| 6,177,650 B1 * | 1/2001 | Watanabe et al. .......... 219/130.5 |
| 6,522,949 B1 * | 2/2003 | Ikeda et al. .................... 700/245 |
| 7,034,249 B2 * | 4/2006 | Gustafsson et al. ...... 219/124.34 |
| 7,376,488 B2 * | 5/2008 | Watanabe et al. ............. 700/264 |

FOREIGN PATENT DOCUMENTS

JP 2006-72673 3/2006

OTHER PUBLICATIONS

Japanese Office Action issued May 15, 2012 in patent application No. 2010-179052 with English translation.

* cited by examiner

*Primary Examiner* — Sang Y Paik
(74) *Attorney, Agent, or Firm* — Oblon, Spivak, McClelland, Maier & Neustadt, L.L.P.

(57) ABSTRACT

A three-dimensional rectangular coordinate system is set in which the direction of a weld line is the Y direction, a direction perpendicular to a surface of a material to be welded is the Z direction, and a direction perpendicular to the Y direction and the Z direction is the X direction. A coordinate system A of $X_A Y_A Z_A$ is set as a previous stage coordinate system, which ranges from a previous step to a current step, and a coordinate system B of $X_B Y_B Z_B$ is set as a next stage coordinate system, which ranges from the current step to a next step. The weld line is defined by these coordinate systems that use a workpiece as a reference, and an operator specifies the amount of travel of a torch in these workpiece coordinate systems. By this method, offline teaching can be accurately performed in a welding system without requiring skill in operation.

5 Claims, 16 Drawing Sheets

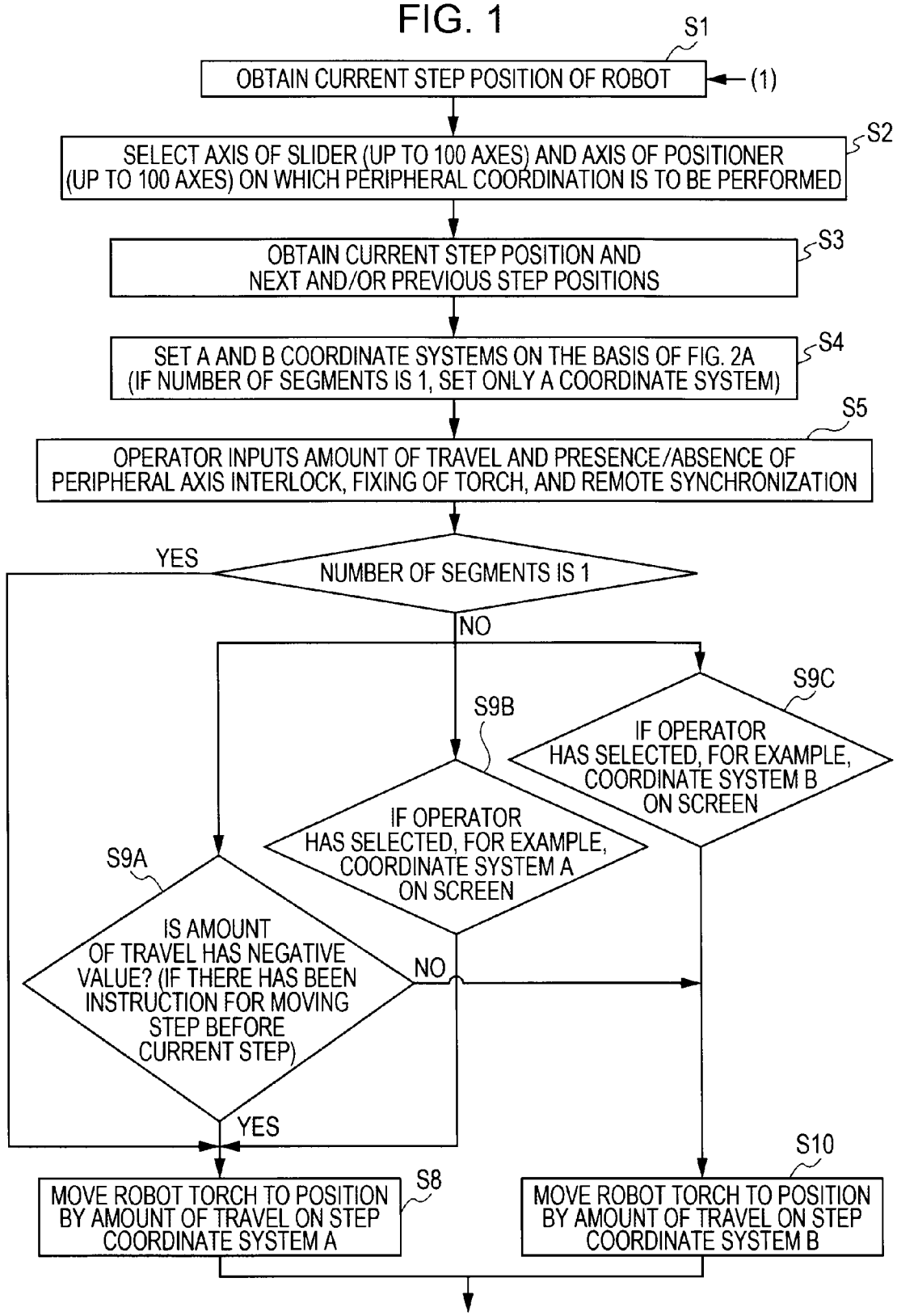

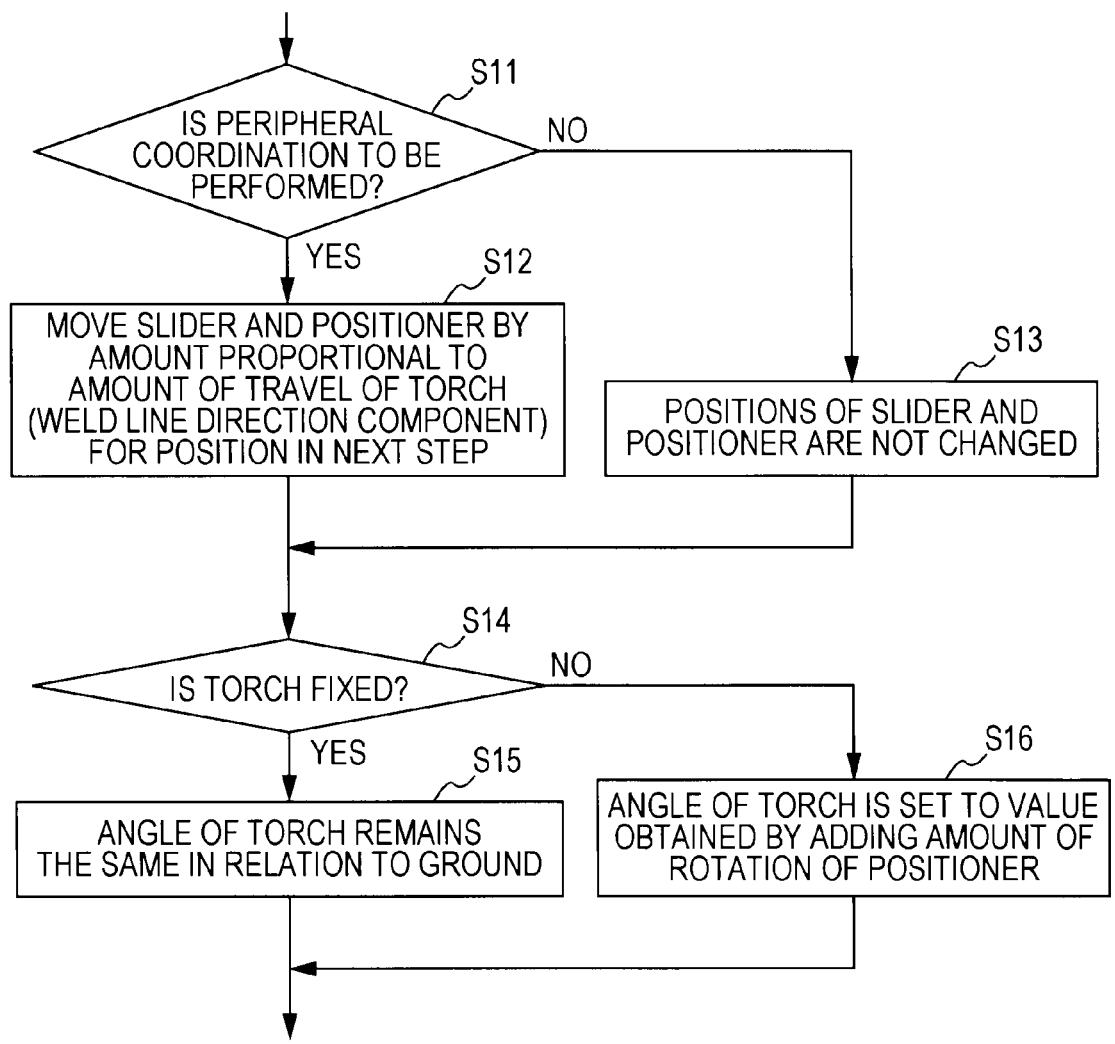

FIG. 8
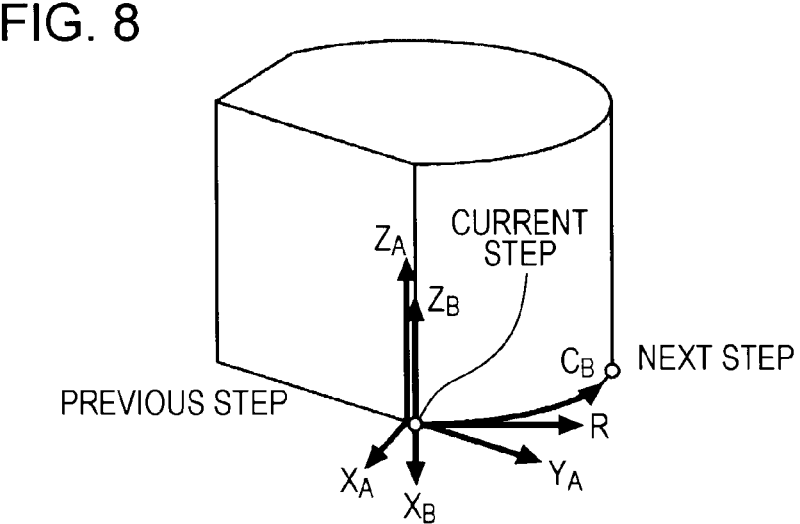
FIG. 9
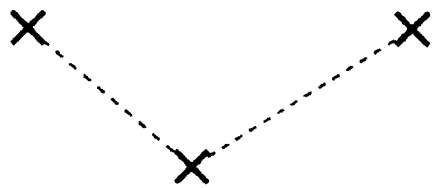
FIG. 10
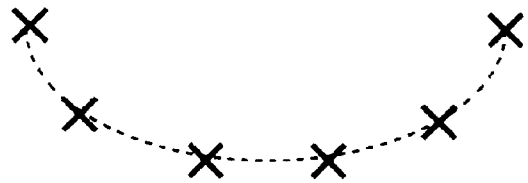
FIG. 11
WELDING DIRECTION
| AMOUNT OF TRAVEL | ··· | ___ mm |
| WELDING HORIZONTAL DIRECTION TRAVEL AMOUNT | ··· | ___ mm |
| WELDING VERTICAL DIRECTION TRAVEL AMOUNT | ··· | ___ mm |
- PERIPHERAL AXIS INTERLOCK
- FIXING OF TORCH
- REMOTE SYNCHRONIZATION

DIRECTION OF ROTATION

WORKPIECE COORDINATE SYSTEM

STEP n
POSITIONER −45°

INTERMEDIATE
POINT N ADDED
POSITIONER 0°

STEP n+1
POSITIONER 45°

STEP N    INTERMEDIATE    STEP N+1
          POINT N

FIG. 19
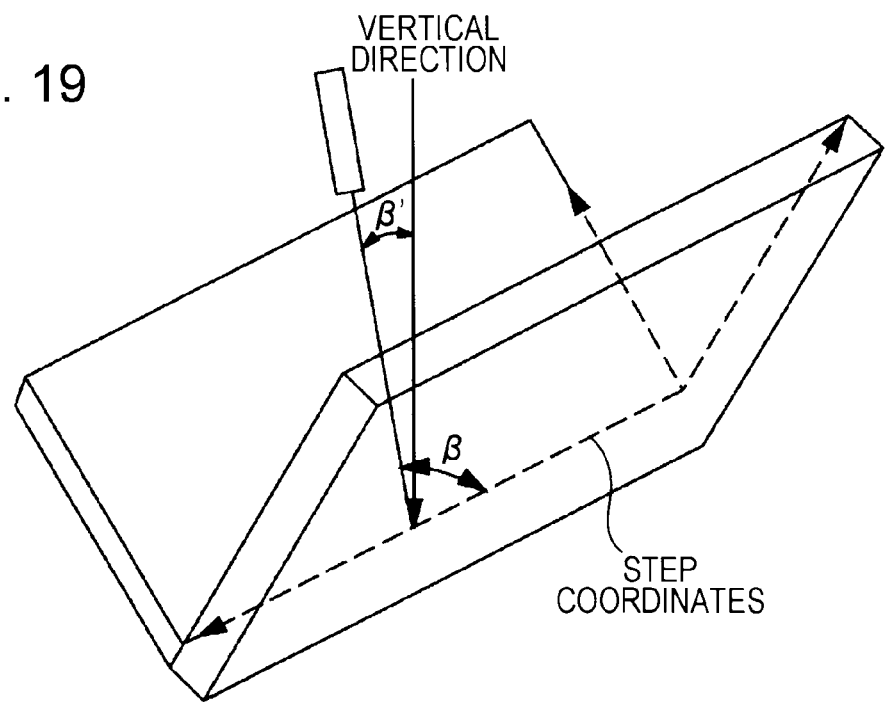
FIG. 20
ANGLES OF TORCH
α ·· 0.0   ☑ VALUE RELATIVE TO VERTICAL LINE
β ·· 5.0   ☑ VALUE RELATIVE TO VERTICAL LINE
γ ·· 90.0
FIG. 21
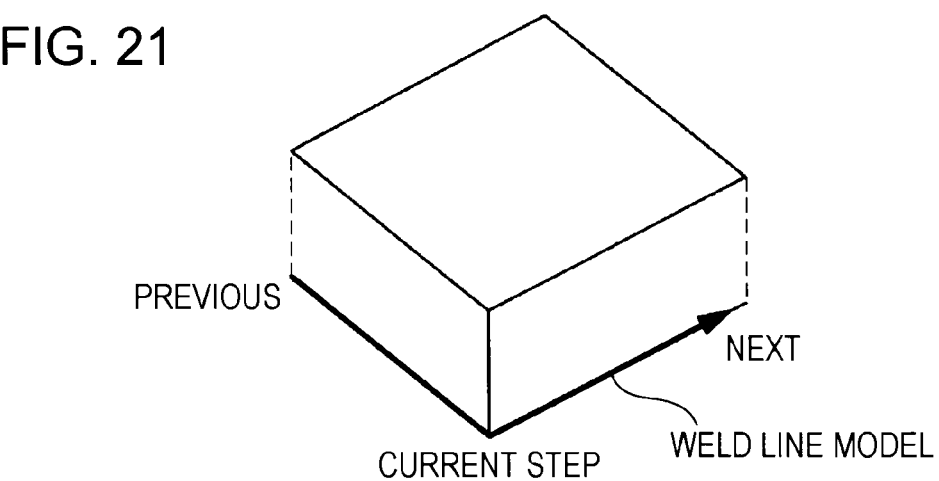

MATERIALS TO BE WELDED

OFFLINE TEACHING METHOD

BACKGROUND OF THE INVENTION

1. Field of the Invention

The present invention relates to an offline teaching method for, when a workpiece is automatically welded by a welding robot, making the welding robot memorize a weld line, which is the target of the work, and to an offline teaching method by which teaching using the welding robot can be performed in a safe and precise manner.

2. Description of the Related Art

As illustrated in FIG. 23, a workpiece 1 to be welded is set in a positioner 2, which adjusts the attitude thereof. A welding robot 3 having a welding torch is arranged close to the workpiece 1 set in the positioner 2. The welding robot 3 is set on a slider 4 whose movement allows the welding robot 3 to move in parallel to the workpiece 1 at positions close to the workpiece 1. If the reach of the welding robot 3 is insufficient (if the welding torch does not reach a weld line to be welded), the welding robot 3 itself moves relative to the workpiece 1 to allow the welding torch to complete a movement along a weld line.

The slider 4 may be one having three-degree-of-freedom X, Y, and Z axes that are perpendicular to one another and enable transfer as illustrated in FIG. 23, or may be one having a rotation axis for rotating the robot as well as the transfer axes as illustrated in FIG. 24. The slider 4 serves as an auxiliary axis that moves the welding robot 3.

On the other hand, the positioner 2 holds the workpiece 1 and allows the attitude of a weld line during welding to have an angle that suits the welding. As illustrated in FIG. 25, most popular positioners are doubly supporting one-axis positioners that each have a single rotation axis and that support a workpiece from both sides.

In addition, as illustrated in FIG. 26, there is also a two-axis positioner 2a that has two rotation axes and that allows the attitude of a weld line to have an arbitrary angle. Furthermore, positioners have been improved recently and, as illustrated in FIG. 27, there is a five-axis positioner 2b that has five rotation axes. In this case, a vertical first axis 2c is located at the center, and a first positioner 2d that includes a second axis and a third axis and a second positioner 2e that includes a fourth axis and a fifth axis are arranged on both ends of the first axis 2a, respectively. The first positioner 2d and the second positioner 2e can rotate around the first axis 2c. When a workpiece is being set in either positioner, a welding robot automatically welds a workpiece set in the other positioner. When both operations have been completed, the rotation angle (first axis) at the base rotates such that the newly set workpiece is positioned on the welding robot side and the welded workpiece is moved to a delivery position (workpiece setting position) side. At this time, the positioner that is holding the welded workpiece drives the two axes thereof to set the workpiece in a delivery device. In this five-axis positioner, for example, the first positioner 2d including the second axis and the third axis can serve for automatic welding by the robot and, at the same time, the second positioner 2e including the fourth axis and the fifth axis can serve for correction welding that is manually performed. In addition, although not illustrated, there are positioners that each have a transfer axis for moving a workpiece. Thus, a positioner can be defined as a device for moving a workpiece.

The workpiece 1 to be welded is, for example, a component of a construction machine, and a component of a construction machine generally has a complicated shape as illustrated in FIG. 28. Connections between an upper board and a side board or connections between a lower board and the side board are weld lines. Since the upper board, the lower board, and the side board in a component of a construction machine have curvatures, the weld lines are curves both in a plan view and in a side view. This workpiece is fixed in a clamping jig and mounted in a positioner, and then automatically welded by the welding robot.

If the welding robot performs automatic welding, a groove between materials 5 and 6 to be welded is oriented upward and a positioner is rotated such that the attitude of a torch 7 of the welding robot is oriented downward as illustrated in FIG. 29. Flat welding is then performed on the workpiece (materials 5 and 6 to be welded).

In addition, if horizontal fillet welding is performed on a weld line, the positioner is rotated in a manner similar to above so that the attitude of a workpiece illustrated in FIG. 30 is achieved for welding, and then horizontal fillet welding is performed. In the case of horizontal fillet welding, because, if the welding is performed at high current and high speed, beads may trickle down and therefore it is difficult to adjust the shapes of the beads, the positioner is rotated and flat welding is performed, if possible.

If a workpiece to be welded is bent boards as illustrated in FIG. 28, in order to successively perform flat welding using the welding robot, it is necessary to maintain the same inclination of weld lines in grooves and to make the robot and the positioner move in a coordinated manner before and after bent portions. In addition, if weld lines are long enough to exceed the reach of the robot, the slider needs to operate in a coordinated manner, too.

In order to perform these operations of the robot, teaching is needed. Teaching for the robot using an actual machine is performed by using a teaching pendant attached to a controller of the robot, guiding the robot, and making the robot memorize welding lines, which are work lines. In order to make the robot memorize work lines, the robot is guided to points through which the robot is to pass one by one, while an operator presses a position memorizing button at each point. A memory in the controller stores each position and a program is created.

However, as described above, since a component of a construction machine is likely to be large and a slider, a positioner, and the like are likely to be attached, which means that there are a lot of axes to be operated, skill in the operation is required. In addition, in the case of a large-sized workpiece, a positioner to be used is also large, and it is not rare that the workpiece is located at a position higher than the operator's head. The operator needs to go up to a high portion of the workpiece and then go down again, which is not easy work. In addition, there is a risk that the operator may fall from a high position.

Therefore, instead of teaching work using an actual machine, offline teaching, in which teaching is performed using a personal computer, is attracting attention as an effective method. As illustrated in FIG. 31, offline teaching is performed using a 3D model robot system and a workpiece displayed on a screen of a personal computer 11. A program created through offline teaching is transferred to a robot 13 through a communication cable connected to the personal computer 11 and a controller 12. After that, the robot 13 is used to move the torch on an actual workpiece without discharging arc in accordance with the program in order to check if the created teaching is correct.

Offline teaching is a significantly effective function because the robot and the positioner can be moved in a short period of time. For example, the rotational speed of a positioner for an actual large-sized workpiece is 3 rpm and therefore it takes 20 seconds to make the positioner rotate one revolution, whereas, in the case of offline teaching, the positioner can rotate one revolution in an instant. In addition, in the case of guiding the robot to a weld line, it is necessary, in teaching using an actual machine, to slow down the robot around a workpiece in order to avoid collision, and to accurately position the robot, which takes much time. In the case of offline teaching, however, the robot can move to a certain position just by clicking a surface of a workpiece model on the personal computer and therefore it takes little time, which is advantageous.

However, in the case of offline teaching, there has been a problem in that it is difficult to obtain an attitude that suits welding and appropriate angles of the torch and to perform checking.

In the case of offline teaching, although it is possible to see a workpiece from an arbitrary viewpoint, there is a problem in that it is hard to instinctively recognize, on a two-dimensional display, the angle of a weld line relative to the ground. That is, although it is easy to understand that the welding attitude is downward in the case of a simple workpiece as in FIG. 29, if a weld line is on bent boards as in FIG. 28, it is virtually impossible to make the welding attitude be oriented downward through visual recognition using a screen, and therefore a quantitative index of the attitude is needed.

The reason why a quantitative attitude is needed when flat welding is performed on the workpiece illustrated in FIG. 29 is not because the inclination of the weld line is simply made parallel to the ground, but because the weld line needs to be intentionally inclined downward in the forward direction by 1° to 3° in order to control the shape of beads.

Therefore, the inventors have already proposed an invention disclosed in Japanese Unexamined Patent Application Publication No. 2006-72673. That is, a method for setting a positioner for a welding robot disclosed in Japanese Unexamined Patent Application Publication No. 2006-72673 is a method for setting a positioner for a welding robot in which a workpiece to be welded is set in the positioner for the welding robot and the position of the positioner is determined such that the workpiece is arranged in a desired manner in relation to a welding torch. The method includes the steps of reading, by a computer, a three-dimensional model of the workpiece as well as information regarding a mechanism of the positioner, specifying either a weld surface or a weld line of at least one of materials to be welded in three-dimensional model, determining, by calculation, a reference line for determining an inclination of a portion to be welded on the basis of information regarding the specified weld surface or weld line, setting, if angles between the reference line and a vertical direction in terms of two directions that are perpendicular to each other are assumed to be $\alpha$ and $\beta$, target angles of $\alpha$ and $\beta$, and obtaining, by calculation, a single position or a plurality of positions of the positioner at which $\alpha$ and $\beta$ are within certain ranges of the target angles by moving the workpiece model within a range limited by the mechanism of the positioner.

SUMMARY OF THE INVENTION

However, in this example of the related art, a method for specifying the angles of the torch relative to a groove, which are an important parameter in welding, is not referred to. That is, if the attitude of a groove is quantitatively and appropriately set for a workpiece as in FIG. 28, appropriate angles of the torch cannot be set in the example of the related art. In addition, although the torch, which is located at the end of the robot, is moved to a target position of the robot by clicking the screen using a mouse, the screen needs to be magnified and adjusted to an appropriate size in order to enable a precise click on the weld line, which requires skill in the operation and additional work to some degree. In the example of the related art, although the robot has a function of circular interpolation, the curvature of an arc may change from moment to moment in the case of a bent board and, in order to catch up with the changes in the curvature, it is necessary, if a point is to be added each time the curvature has changed, to appropriately add points halfway through the arc. In addition, in a system including a peripheral axis, it is necessary to set an intermediate point to be added at an appropriate position determined by proportionally dividing the positions of a slider and a positioner at the points before and after the point to be added, in order to operate the entire robot system smoothly. This work also requires skill to some degree.

In addition, as illustrated in FIG. 32, points for back stepping are added to a welding beginning point and a welding end point. For example, in the case of the welding beginning point, as illustrated in FIG. 32, arcing begins at an S1 position. After moving to an S2 position by a distance of L1 (for example, 30 mm), the torch turns around and moves back by a distance of L2 (similarly, for example, 30 mm), and then enters a main welding section S4 after passing by an S3 position. On the other hand, at a corner, as illustrated in FIG. 33, arcing is weakened at an S11 position in order not to melt the corner of a weld line by arc during welding, though the productivity is reduced. After that, the weld line is bent at an S12 position, which is the corner located at a distance of L1 away from the S11, and the welding conditions need to be reset at an S13 position, which is located at a distance of L2 away from the S12 position. In this case, the positions S1, S2, S3, S11, S12, and S13 need to be added in offline teaching.

In an actual robot system, since a robot has six or more degrees of freedom and includes a slider and a positioner, it is necessary to perform a lot of operations when the position of a torch on a weld line is changed.

The present invention is made in view of such problems, and an object thereof is to provide an offline teaching method by which offline teaching can be accurately performed in a welding system without requiring skill in operation.

An offline teaching method according to a first aspect of the present invention is an offline teaching method for performing, on a welding robot, offline teaching of a weld line including a segment. The offline teaching method includes the steps of obtaining, by a computer, a position of a current step of a torch of the welding robot and a position of a next or a previous step, setting, by the computer, either a previous stage coordinate system ranging from the previous step to the current step or a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction, inputting, by an operator, an amount of travel in the set coordinate system, and displaying, by the computer, the torch of the welding robot such that the torch is moved along the weld line in the next stage coordinate system or the previous stage coordinate system by the amount of travel.

An offline teaching method according to a second aspect of the present invention is an offline teaching method for performing, on a welding robot, offline teaching of a weld line divided into a plurality of segments by steps. The offline teaching method includes the steps of obtaining, by a computer, a position of a current step of a torch of the welding robot and positions of next and previous steps in order to allow the torch of the welding robot to move along a previous segment or a next segment, setting, by the computer, a previous stage coordinate system ranging from the previous step to the current step and a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction or, if the segment of the weld line is an arc, an XCZ coordinate system in which a radial direction of the arc is an X direction, a circumferential direction of the arc is a C direction, and a direction perpendicular to a base material to be welded is a Z direction, inputting, by an operator, an amount of travel in the set coordinate system, and displaying, by the computer, the torch of the welding robot such that the torch is moved along the weld line in the next stage coordinate system or the previous stage coordinate system by the amount of travel.

The offline teaching method according to the second aspect of the present invention may be configured such that, if the amount of travel input by the operator has a negative value, the previous stage coordinate system is automatically selected by the computer and, if the amount of travel has a positive value, the next stage coordinate system is automatically selected by the computer.

An offline teaching method according to a third aspect of the present invention is an offline teaching method for performing, on a welding robot, offline teaching of a weld line divided into a plurality of segments by steps. The offline teaching method includes the steps of obtaining, by a computer, a position of a current step of a torch of the welding robot and positions of next and previous steps in order to allow the torch of the welding robot to move along a previous segment or a next segment, setting, by the computer, a previous stage coordinate system ranging from the previous step to the current step and a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction or, if the segment of the weld line is an arc, an XCZ coordinate system in which a radial direction of the arc is an X direction, a circumferential direction of the arc is a C direction, and a direction perpendicular to a base material to be welded is a Z direction, inputting, by an operator, an amount of travel in the set coordinate system, and displaying, by the computer using a coordinate system selected by an instruction from the operator, the torch of the welding robot such that the torch is moved along the weld line in the next stage coordinate system or the previous stage coordinate system by the amount of travel.

The offline teaching method according to the third aspect of the present invention may be configured to include the step of changing, by the operator, an angle of the torch in the previous stage coordinate system or the next stage coordinate system.

In the offline teaching methods according to the first to third aspects of the present invention, it is preferable to include the step of selecting, before the step of obtaining, axes of a slider and a positioner on which peripheral coordination is to be performed, inputting, by the operator, presence or absence of peripheral axis coordination in the step of inputting the amount of travel, and moving, if the peripheral axis coordination is to be performed, at least either the slider or the positioner by an amount proportional to the amount of travel of the torch relative to the position of the next step.

In this case, for example, it is possible to configure the offline teaching methods such that, if the torch is to be fixed in place, an angle of the torch is kept the same relative to a positioner setting surface in the coordinate system by setting an angle obtained by subtracting an amount of rotation of the positioner as the angle of the torch, and, if the torch is not to be fixed in place, the angle of the torch is not changed in the coordinate system.

According to the present invention, the operator can move the torch, the slider, and the positioner by simply specifying a position on a weld line, and therefore the number and the types of operations performed by the operator can be reduced, which accordingly simplifies the operations. In addition, because it is possible to avoid an incorrect movement to a position beyond a weld line, precise operation can be performed. The operator can perform offline teaching without considering the structure of a robot system, and therefore an offline teaching apparatus according to an aspect of the present invention is a useful tool for an operator who is not accustomed to operating a robot. Since the angles of the torch can be quantitatively specified with angles between reference planes of a workpiece in a welding position and the vertical direction, it is possible to easily and efficiently set the angles of the torch.

Thus, in the present invention, since teaching can be performed by specifying a position on a weld line using the previous stage coordinate system or the next stage coordinate system, the operability can be significantly improved as a guiding function that focuses upon the characteristics of the weld line.

BRIEF DESCRIPTION OF THE DRAWINGS

FIG. 1 is a flowchart illustrating an offline teaching method according to an embodiment of the present invention;

FIG. 3 is a flowchart illustrating steps subsequent to those illustrated in FIG. 1;

FIG. 8 is a schematic diagram illustrating a case in which the weld line is a combination between a straight line and an arc;

FIG. 9 is a diagram illustrating linear interpolation;

FIG. 10 is a diagram illustrating circular interpolation:

FIG. 11 is a schematic diagram illustrating an input screen;

FIG. 19 is a diagram illustrating a method for specifying an angle β of the torch;

FIG. 20 is a diagram illustrating an example of a screen for specifying the angles of the torch;

FIG. 21 is a diagram illustrating a weld line model;

DESCRIPTION OF THE PREFERRED EMBODIMENTS

Figure 2A:
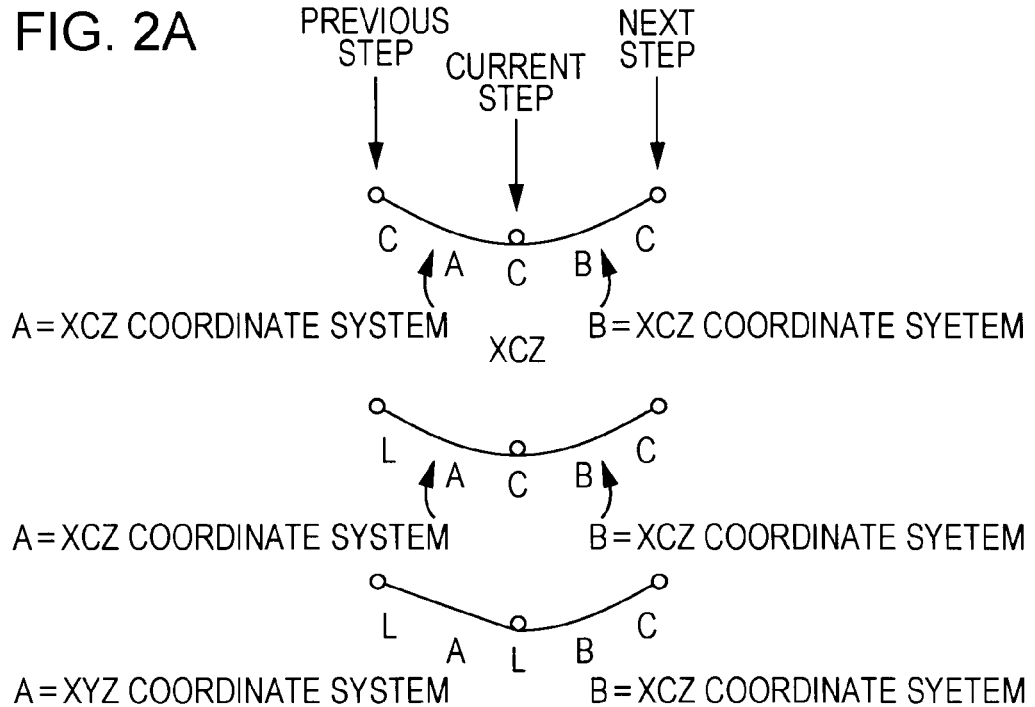
FIGS. 2A, 2B, and 2C are diagrams illustrating coordinate systems.
Figure 2B:
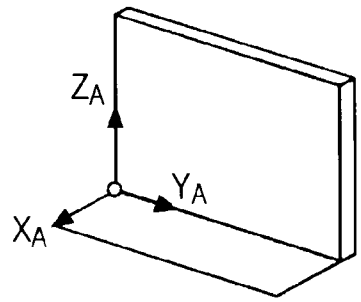
Figure 2C:
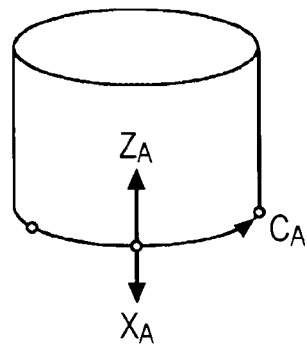
Figure 4:
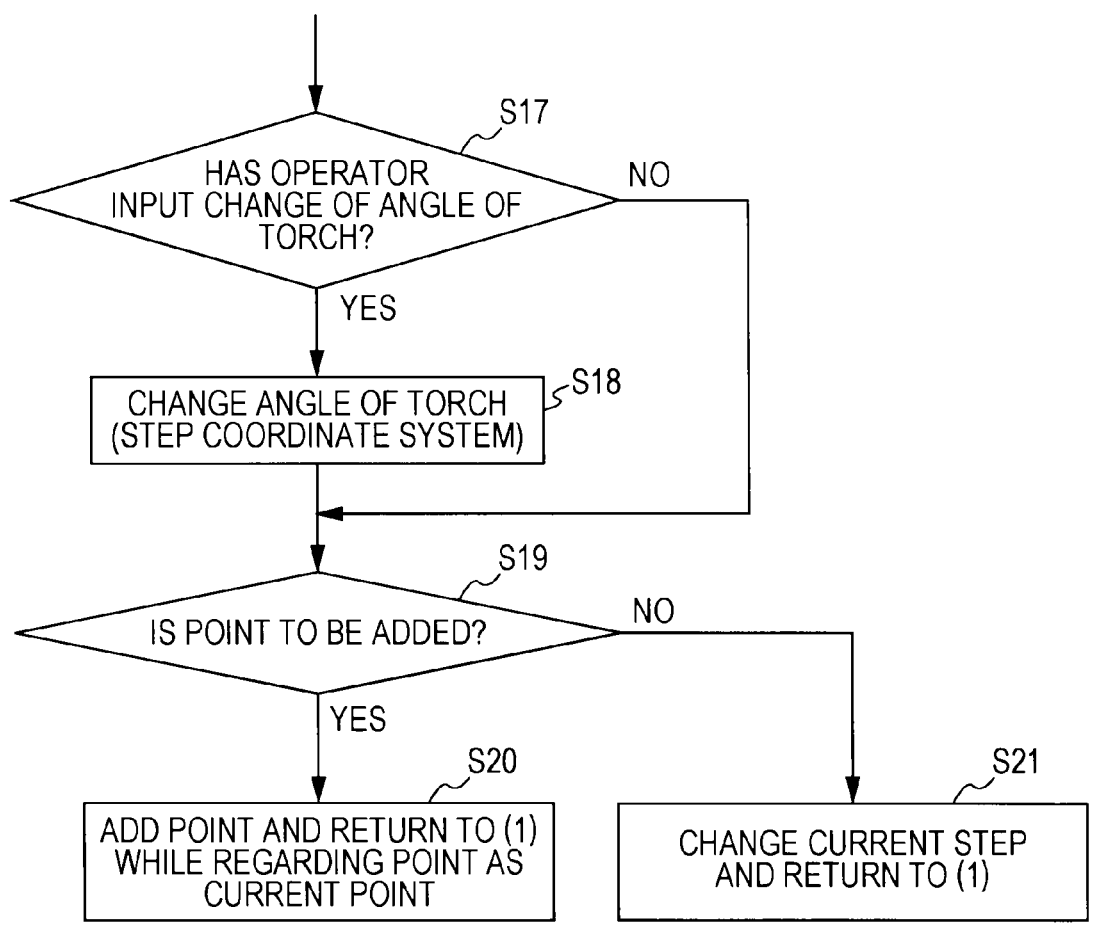
FIG. 4 is a flowchart illustrating steps subsequent to those illustrated in FIG. 3.
Figure 5:
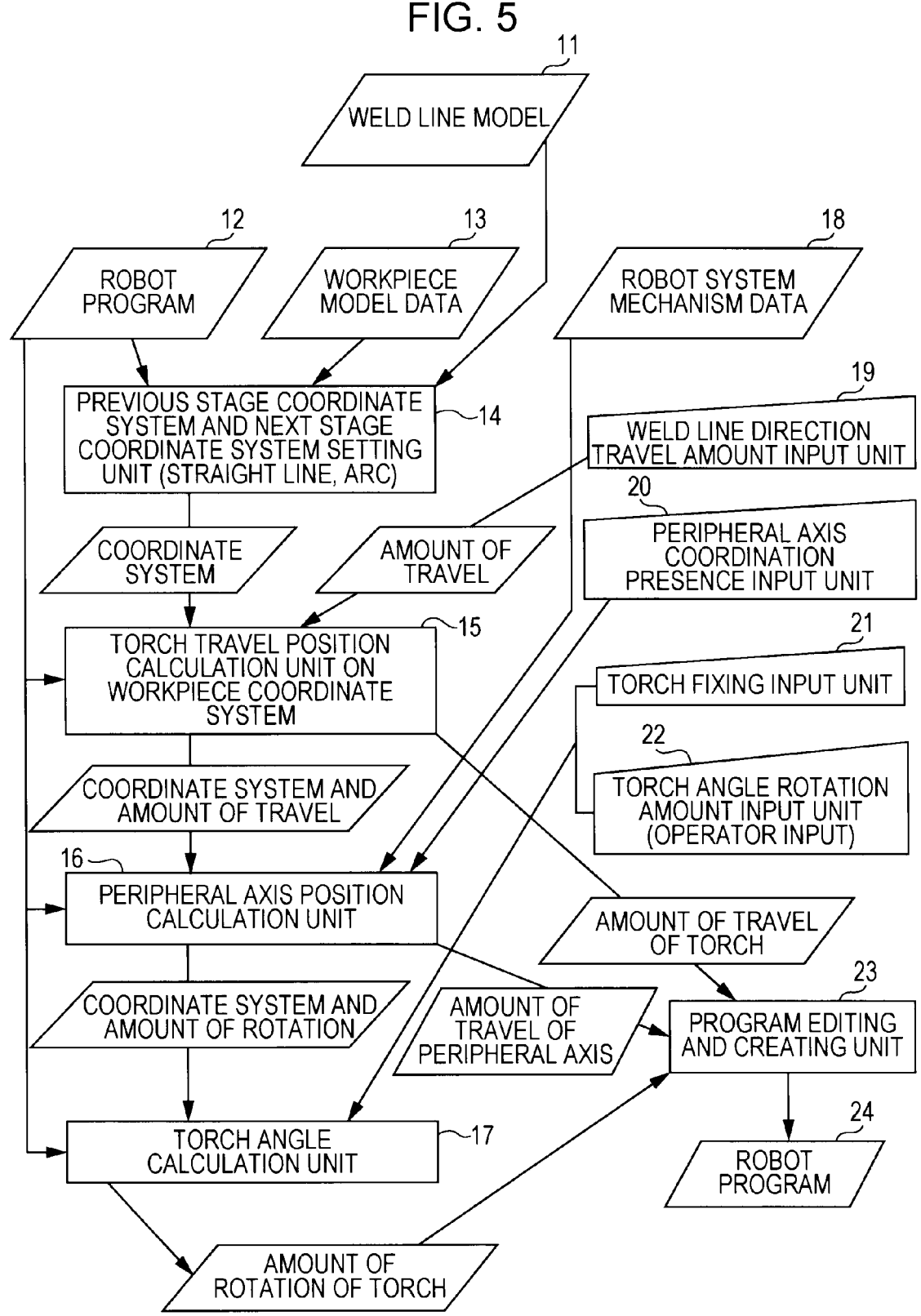
FIG. 5 is a block diagram of the embodiment.
Figure 6:
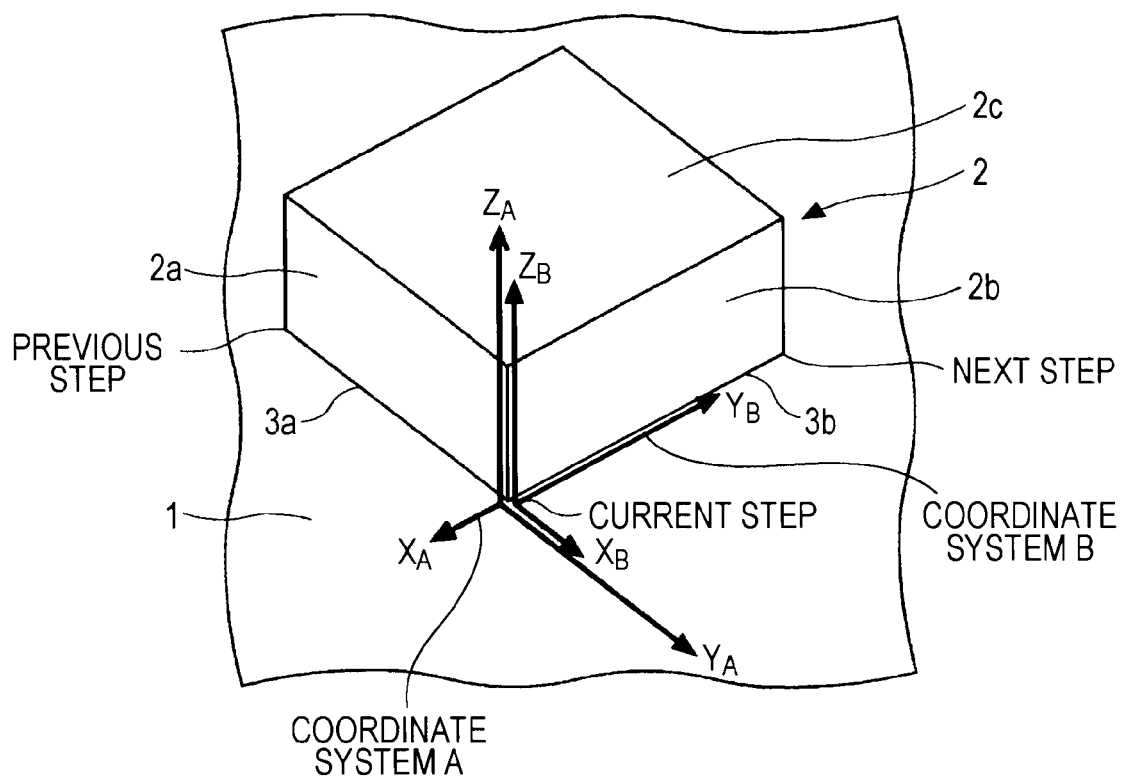
FIG. 6 is a schematic diagram illustrating a previous stage coordinate system and a next stage coordinate system at a time when a weld line is a straight line.
Figure 7:
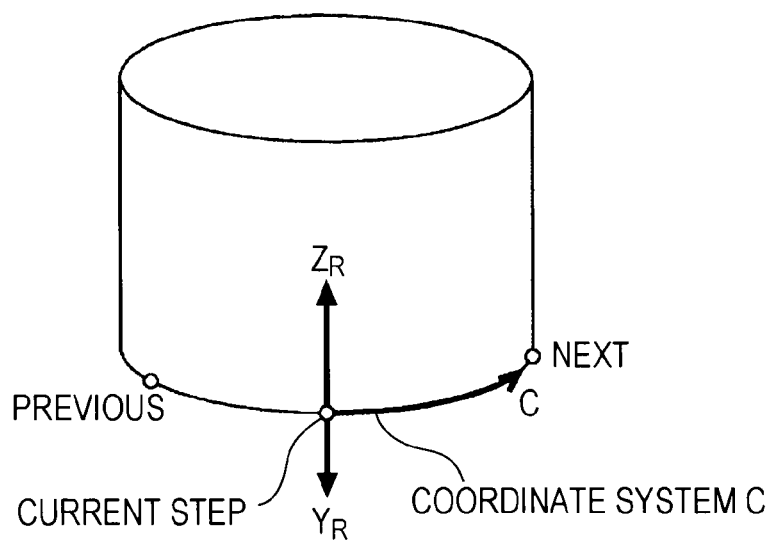
FIG. 7 is a schematic diagram illustrating a previous stage coordinate system and a next stage coordinate system at a time when the weld line is an arc.
Figure 31:
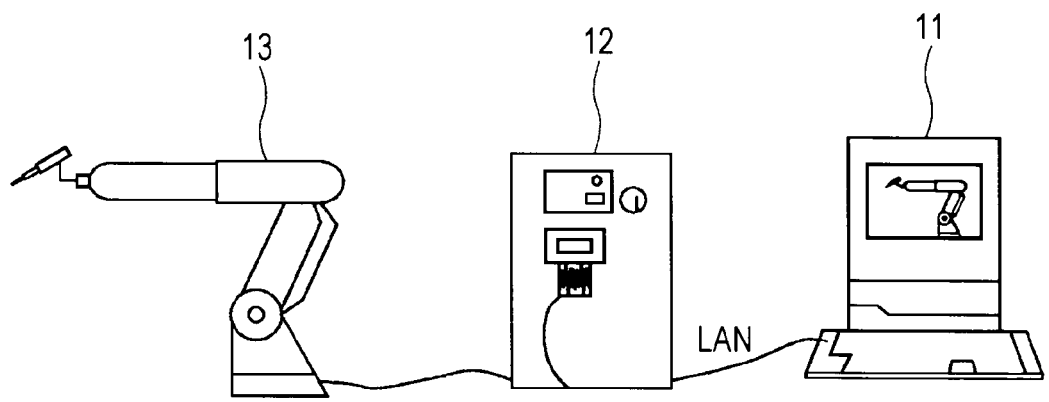
FIG. 31 is a schematic diagram illustrating a welding robot and an offline teaching system.
Figure 32:
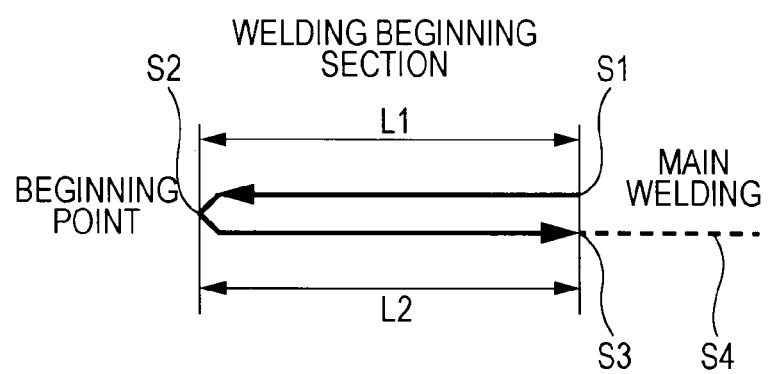
FIG. 32 is a diagram illustrating a method of back stepping.
Figure 33:
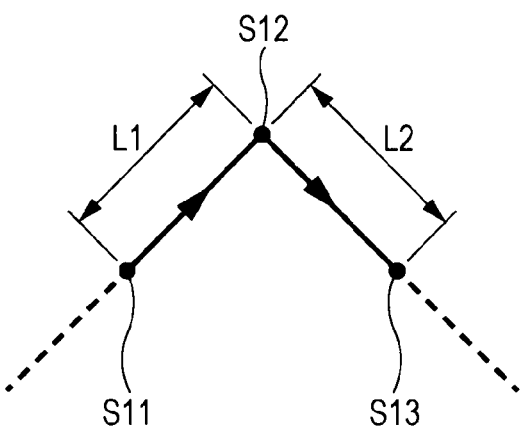
FIG. 33 is a diagram illustrating the concept of an intermediate point.

An embodiment of the present invention will be specifically described hereinafter with reference to the accompanying drawings. FIGS. 1, 3, and 4 are flowcharts illustrating an offline teaching method according to the embodiment of the present invention. FIGS. 2A, 2B, and 2C are diagrams illustrating coordinate systems. FIG. 5 is a block diagram illustrating a control method according to the embodiment of the present invention. FIGS. 6 and 7 are schematic diagrams illustrating a previous stage coordinate system and a next stage coordinate system. FIG. 9 is a diagram illustrating a method of linier interpolation. FIG. 10 is a diagram illustrating a method of circular interpolation. In the offline teaching method according to this embodiment, a teaching program is created on a personal computer illustrated in FIG. 31.

FIG. 5 is a block diagram illustrating a control method for creating a robot program on the personal computer. First, in an offline teaching system according to this embodiment, as illustrated in FIG. 5, a previous stage coordinate system and next stage coordinate system setting unit 14 reads a weld line model 11, a robot program 12, and workpiece model data 13 in advance. Robot system mechanism data 18 is a robot system model that includes mechanism models of a robot, a slider, and a positioner, and the strokes of axes. The robot program 12 includes steps that serve as work data for a weld line created by a robot system of the robot system mechanism data 18. It is to be noted that a workpiece model and a program may be newly created on the offline system instead of being read. The robot program 12 is the target of correction in the current creation process, and a robot program 24 is a robot program that has been corrected in the current creation process. A robot program 24 that has been created in the previous creation process is saved as a robot program 12.

The previous stage coordinate system and next stage coordinate system setting unit 14 defines a previous stage coordinate system and a next stage coordinate system, which serve as references for moving the robot, on the basis of the robot program 12 and the workpiece model data 13. However, there is a case in which the number of segments is 1 as in the case of a steel column. In this case, there is no distinction between the previous stage and the next stage, and therefore a single coordinate system is set. The coordinate system varies depending on the interpolation mode of steps of a program. It is to be noted that, in the interpolation mode, in the case of the linear interpolation illustrated in FIG. 9, a torch of the robot linearly moves between steps, and, in the case of the circular interpolation illustrated in FIG. 10, the torch of the robot moves in an arcuate manner.

As in FIG. 6, if a weld line is a straight line, an XYZ coordinate system is set. Suppose that a material 2 to be welded is disposed on a material 1 to be welded, and then a weld line 3a between a face 2a of the material 2 to be welded ranging from the previous step to the current step and the material 1 to be welded and a weld line 3b between a face 2b of the material 2 to be welded ranging from the current step to the next step and the material 1 to be welded are to be fillet-welded. A weld line in automatic welding includes the weld line 3a and the weld line 3b. The weld line 3a is a segment of the weld line and the weld line 3b is a segment subsequent to the weld line 3a. The weld lines 3a and 3b, which are segments, are straight lines.

Here, a three-dimensional rectangular coordinate system is set in which the direction of the weld line is the Y direction, a direction perpendicular to a surface of the material 1 to be welded is the Z direction, and a direction perpendicular to the Y direction and the Z direction is the X direction. In addition, a coordinate system A of $X_A Y_A Z_A$ is set as a previous stage coordinate system, which ranges from the previous step to the current step, and a coordinate system B of $X_B Y_B Z_B$ is set as a next stage coordinate system, which ranges from the current step to the next step. Therefore, a weld line segment ranging from the previous step to the current step is in the $Y_A$ direction, and a weld line segment ranging from the current step to the next step is in the $Y_B$ direction. In order to determine a coordinate system, a direction of an axis other than the Y direction needs to be specified. As this direction, a direction perpendicular to a surface of a workpiece model, that is, the direction (Z direction) perpendicular to the surface of the material 1 to be welded is used. Thus, the weld line segment ranging from the previous step to the current step is subjected to teaching using the coordinate system A of $X_A Y_A Z_A$, and the weld line segment 3b from the current step to the next step is subjected to teaching using the coordinate system B of $X_B Y_B Z_B$. It is to be noted that the X and Y coordinates are used, for example, to set a target position at a second path or higher in multilayer mounding. However, there is a case in which the number of segments is 1. In this case, the weld line is invariably a straight line, and therefore $X_A Y_A Z_A$ is selected (FIG. 2B).

As illustrated in FIG. 7, if a weld line is an arc, a coordinate system is set in which a direction perpendicular to a surface of a material to be welded is the $Z_R$ direction, a direction (radial direction of the arc) perpendicular to the tangential direction of the arc is the $X_R$ direction, and the circumferential direction of the arc is the C direction. In this case, that is, in a case in which the weld line is an arc, too, the $X_A C_A Z_A$ coordinate system, which ranges from the previous step to the current step, and the $X_B C_B Z_B$ coordinate system, which ranges from the current step to the next step, are set.

In addition, as illustrated in FIG. 8, if a weld line is a combination between a straight line segment and an arc segment, a combination of the coordinate system A of $X_A Y_A Z_A$ for the straight line segment that ranges from the previous step to the current step and the coordinate system B of $X_B C_B Z_B$ for the arc segment that ranges from the current step to the next step is set. This holds true for a case in which the previous segment is an arc and the next segment is a straight line.

As illustrated in FIG. 5, an operator inputs the amount of travel of the torch along a weld line to a torch travel position calculation unit 15 on a workpiece coordinate system through a weld line direction travel amount input unit 19, which is a user interface on software. In addition, coordinate systems obtained by the previous stage coordinate system and next stage coordinate system setting unit 14 are input to the torch travel position calculation unit 15. The coordinate systems and the amount of travel are then input to a peripheral axis position calculation unit 16 from the torch travel position calculation unit 15. In addition, when the operator has selected a piece of robot system mechanism data 18 corresponding to a system on which teaching is to be performed from among pieces of robot system mechanism data 18 created by the operator in advance, the selected piece of robot system mechanism data 18 is read by the peripheral axis position calculation unit 16 using software set on the personal computer. On the other hand, if presence of peripheral axis coordination has been input from a peripheral axis coordination presence input unit 20, the operator inputs the presence of peripheral axis coordination to the peripheral axis position calculation unit 16. Furthermore, the operator inputs presence/absence of fixing of the torch to a torch fixing input unit 21 and the amount of rotation of the torch to a torch angle rotation amount input unit 22. The presence/absence of fixing of the torch and the amount of rotation of the angles of the torch are input to a torch angle calculation unit 17 from the torch fixing input unit 21 and the torch angle rotation amount input unit 22. A program editing and creating unit 23 receives the amount of travel of the torch from the torch travel position calculation unit 15 on the workpiece coordinate system, the amount of travel of a peripheral axis from the peripheral axis position calculation unit 16, and the amount of rotation of the torch from the torch angle calculation unit 17. The program editing and creating unit 23 creates the robot program 24, which is the results of teaching for moving the torch of the robot and peripheral devices, on the basis of the amount of travel of the torch, the amount of travel of the peripheral axis, and the amount of rotation of the angles of the torch.

Next, the offline teaching method according to this embodiment will be described with reference to FIGS. 1 to 4. In this offline teaching method, a welding robot is subjected to offline teaching of a weld line that has been divided into a plurality of segments by steps. In this offline teaching method, first, a computer obtains the position of the current step of the torch of the robot when moving along a previous segment or a next segment (S1). After that, up to 100 axes of the slider and the positioner on which peripheral coordination is to be performed are selected (S2). Next, the computer obtains the position of the current step and the positions of the next step and/or previous step (step S3 of obtaining).

The computer then sets the previous stage coordinate system, which ranges from the previous step to the current step, and the next stage coordinate system, which ranges from the current step to the next step, using, if a weld line segment is a straight line, the XYZ coordinate system in which the direction of the weld line is the Y direction, a direction perpendicular to a surface of a base material to be welded is the Z direction, and a direction perpendicular to the Y direction and the Z direction is the X direction or, if the weld line segment is an arc, the XCZ coordinate system in which the radial direction of the arc is the X direction, the circumferential direction of the arc is the C direction, and a direction perpendicular to the surface of the base material to be welded is the Z direction (step S4 of setting coordinate systems). However, there is a case in which the number of segments is 1. In that case, the XYZ coordinate system is set for the current system. After that, the operator inputs the mount of travel on the next stage coordinate system (step S5 of inputting the amount of travel). In addition, the operator also inputs presence/absence of peripheral axis coordination and fixing of the torch (step S5 of inputting the amount of travel).

If it is desirable to move the robot in the welding direction, that is, if, for example, the operator has input a positive value as the amount of travel, after the operator has selected a coordinate system for changing the position of the torch (S9B or S9C), the computer moves, if the amount of travel has a positive value, the torch of the welding robot in the welding direction by the amount of travel along the weld line in the coordinate system selected by the operator. In addition, if the amount of travel has a negative value, the computer moves the torch of the welding robot in a direction opposite to the welding direction by the amount of travel along the weld line in the coordinate system selected by the operator. If peripheral axis coordination is to be performed (S11), the slider and/or the positioner are moved by an amount proportional to the amount of travel of the torch in the coordinate system set by the operator (step S12 of coordinating a peripheral axis). However, the computer may automatically select the coordinate system A in the case of a negative input value or the coordinate system B in the case of a positive input value, in order to reduce the burden on the operator for selecting a coordinate system (S9A). It is to be noted that, as can be seen from the above description, either step S9A or steps S9B and S9C is selected in accordance with the setting of presence/absence of selection of a coordinate system made by the operator.

If the torch is not to be fixed in place (NO in S14), the angles of the torch are set in the coordinate system specified by the operator in accordance with the amount of rotation of the positioner (step S16 of setting the angle of the torch). If the torch is to be fixed in place (YES in S14), the angles of the torch are not changed in the next stage coordinate system and remains the same relative to the ground (step S15 of setting the angle of the torch).

In addition, if the operator has input a change in the angles of the torch out of necessity (S17), the angles of the torch are changed in an arbitrary coordinate system specified by the operator (S18).

Whether or not the position and the angle of the torch and the peripheral position that have been changed are added and whether or not the current step is changed to the position and the angle of the torch and the peripheral position that have been added are then determined (S19). If the position and the angle of the torch and the peripheral position that have been changed are to be added, a step is added between the current step and the previous step or between the current step and the next step in accordance with the specification by the operator (S20). If not, the current step is changed (S21).

As described above, since the operator specifies the movement of the torch and the like in the previous stage coordinate system or the next stage coordinate system by setting necessary amounts, the computer converts the trajectory of the movement of the torch into that in a robot coordinate system that uses the welding robot as a reference, and recognizes the movement of the welding robot in the robot coordinate system that uses the welding robot as the reference.

Next, the offline teaching method according to this embodiment will be described more specifically. For example, as illustrated in FIG. 11, the operator clicks, for example, a coordinate system displayed on a screen of the computer to select the coordinate system A or the coordinate system B, and then inputs the amount of travel. As the amount of travel, the amount of travel in the welding direction (Y), the amount of travel in the horizontal direction of welding (X), and the amount of travel in the vertical direction of welding (Z) are input. First, with respect to the welding direction, if the interpolation mode in the current step is that for a straight line and the amount of travel has a negative value, the position of the torch is moved in a direction opposite to the welding direction by a distance of travel in the selected coordinate system illustrated in FIG. 6. On the other hand, if the amount of travel has a positive value, the position of the torch is moved in the welding direction by a distance of travel in the selected coordinate system. The reason why the coordinate systems have been defined for inputting the amount of travel is because, when the robot performs a wire touch sensing operation for detecting a surface of a workpiece, the robot can be allowed to accurately input a surface of the workpiece that is located, for example, 10 mm away from a weld line. As a specific operation, 10 mm is input as the amount of travel in the horizontal direction of welding (X). However, in order to reduce the burden on the operator for selecting a coordinate system, the coordinate system A may be automatically selected when the amount of travel has a negative input value or the coordinate system B may be automatically selected when the amount of travel has a positive input value.

In addition, if the interpolation mode in the current step is that for an arc, the position of the torch is moved along the circumference illustrated in FIG. 7 by a distance of travel. If a negative value has been input as the distance of travel, the torch moves backward. In addition, if a positive value has been input, the torch moves in the welding direction.

Figure 12:
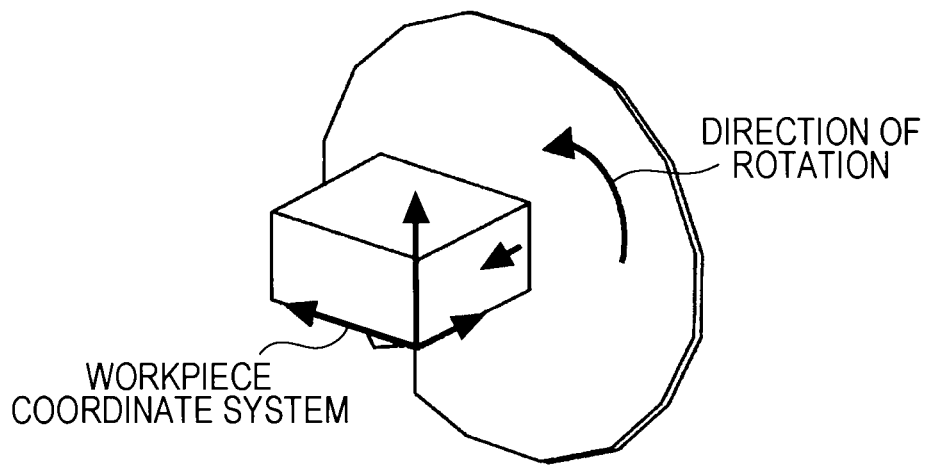
FIG. 12 is a diagram illustrating a work coordinate system representing the relationship between a workpiece and a positioner.

The movement position is calculated in a workpiece coordinate system. That is, as illustrated in FIG. 12, the movement position is set using a distance relative to an origin set for a workpiece as a reference, regardless of the rotational position of the positioner to which the workpiece is attached.

Figure 13:
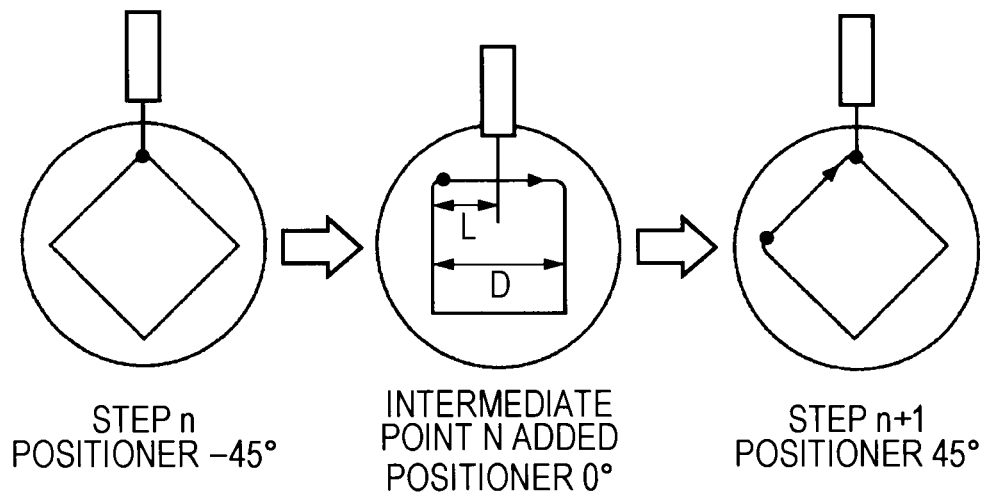
FIG. 13 is a schematic diagram illustrating a method for adding an intermediate point N when a positioner is coordinated.

If this workpiece coordinate system is used, as illustrated in FIG. 13, when an intermediate point N is added between a current step n and a next step n+1, peripheral axis coordination is specified. If, in this case, a positioner is included in the system and, for example, the angle of the positioner is −45° in the step n and 45° in the step n+1, the angle of the positioner is 0° at the intermediate point N. On the other hand, if peripheral axis coordination has not been specified, the positioner keeps holding the value in the current step n. In the case of a system that does not include a positioner, the intermediate point N is obtained while the position of a workpiece remains fixed.

In addition, the position of the torch of the robot is moved, by the torch travel position calculation unit 15, to a position in the workpiece coordinate system a distance L away from the step n. The position of the positioner at the intermediate point N is a position obtained by proportionally dividing the step n and the step n+1 in order for the positioner to smoothly move between the steps. That is, the angle of the positioner at the intermediate point N is represented by the following expression:

$Pm(deg)=L/D \times (Pm(n+1)-Pmn)+Pmn$

Here, Pmn+1 and Pmn denote the angles of the positioner in the step n+1 and the step n, respectively. The angles are calculated by the peripheral axis position calculation unit 16 and, if the system has m axes, the same process is repeated from a first axis to an m-th axis. If peripheral axis coordination is not to be performed, the angle of the positioner at the intermediate point N is represented by the following expression:

$Pm(deg)=Pmn$

Figure 14:
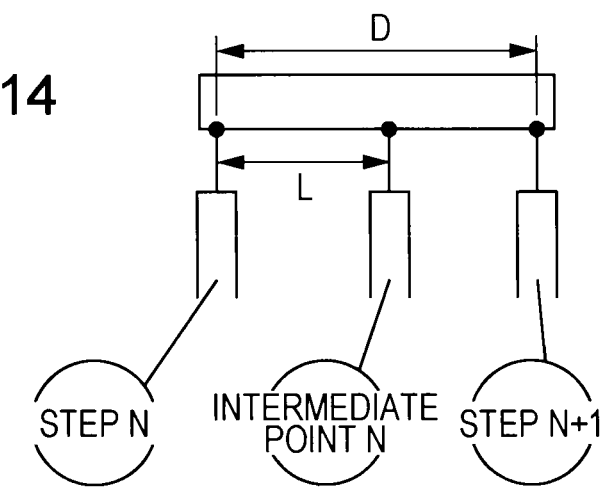
FIG. 14 is a schematic diagram illustrating a method for adding the intermediate point N when a slider is coordinated.

In the case of a system that includes a slider, the same process is performed. That is, as illustrated in FIG. 14, the position of the slider at the intermediate point N is represented by the following expression if peripheral axis coordination has been selected:

$Sldm(mm)=L/d \times (Sldm(n+1)-Sldmn)+Sldmn$

Here, the slider has m axes, and the same process is repeated from a first axis to an m-th axis. In addition, if peripheral axis coordination is not to be performed, the position of the slider at the intermediate point N is represented by the following expression:

$\text{Sldm}(mm)=Sldmn$

The above-described methods for determining the position of peripheral axes are just examples, and, if the speed changes between the step n and the step n+1, the position may be created at an intermediate point of the speed.

Figure 15:
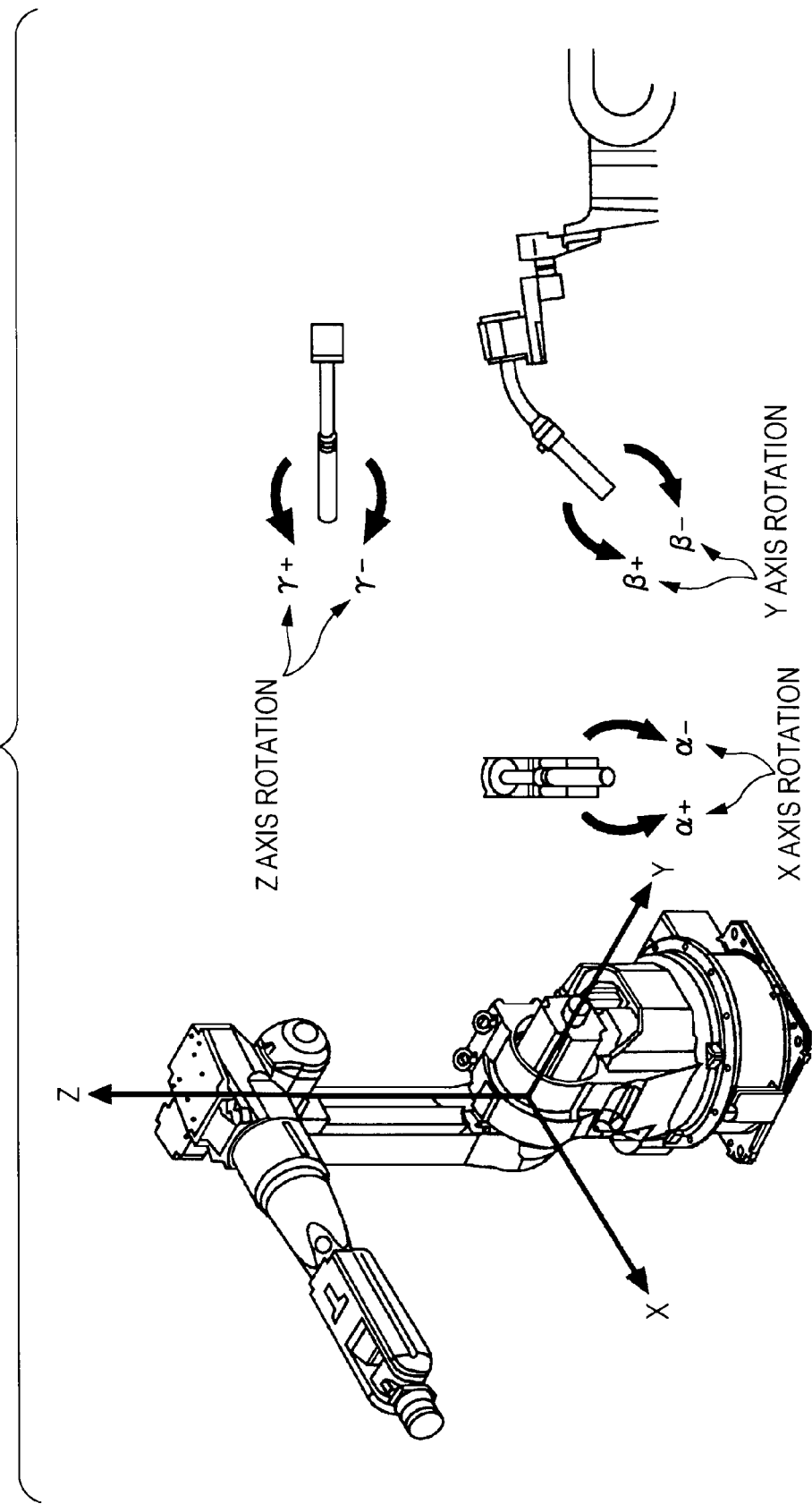
FIG. 15 is a schematic diagram illustrating a method for setting the attitude of a torch.

Next, a method for setting the attitude of the torch will be described. The attitude of the torch is defined by rotational angles $\alpha$, $\beta$, and $\gamma$ of the torch relative to the axes X, Y, and Z, respectively, in the robot coordinate system (FIG. 15).

Figure 16:
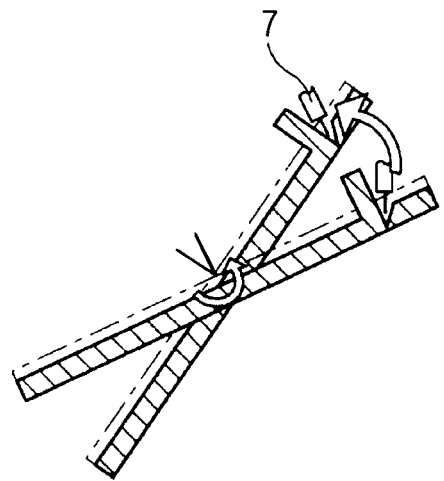
FIG. 16 is a diagram illustrating the relationship between the attitude of the torch and the rotation of a positioner at a time when the torch is not fixed in place.

A selection can be performed as to whether or not the angles of the torch at a time when an intermediate point has been added are to be coordinated with the angles of the positioner at that time. First, if fixing of torch in place has not been selected during setting of fixing of the torch, a torch 7 rotates in synchronization with the rotation of the positioner in a coordinated manner. That is, the attitude of the torch 7 is fixed in the workpiece coordinate system (FIG. 16).

Figure 17:
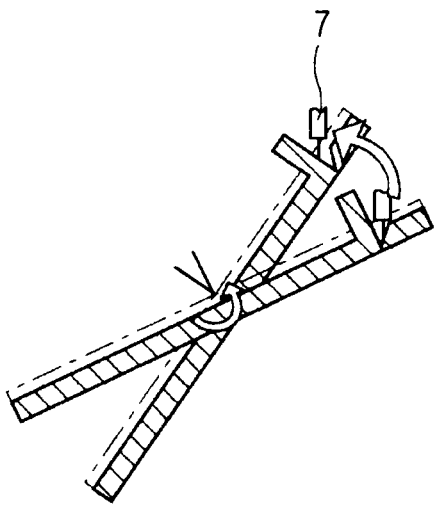
FIG. 17 is a diagram illustrating the relationship between the attitude of the torch and the rotation of the positioner at a time when the torch is fixed in place.

In addition, if fixing of the torch in place has been selected, when the positioner rotates, the angles of the torch 7 are set to angles obtained by subtracting the amount of rotation of the positioner. In doing so, the angles of the torch 7 become constant relative to a positioner setting surface (FIG. 17). That is, in this case, the attitude of the torch 7 is fixed relative to the ground. This setting is utilized when it is desirable to orient the torch 7 to the ground even if there are slight changes in the attitude of a groove.

Figure 23:
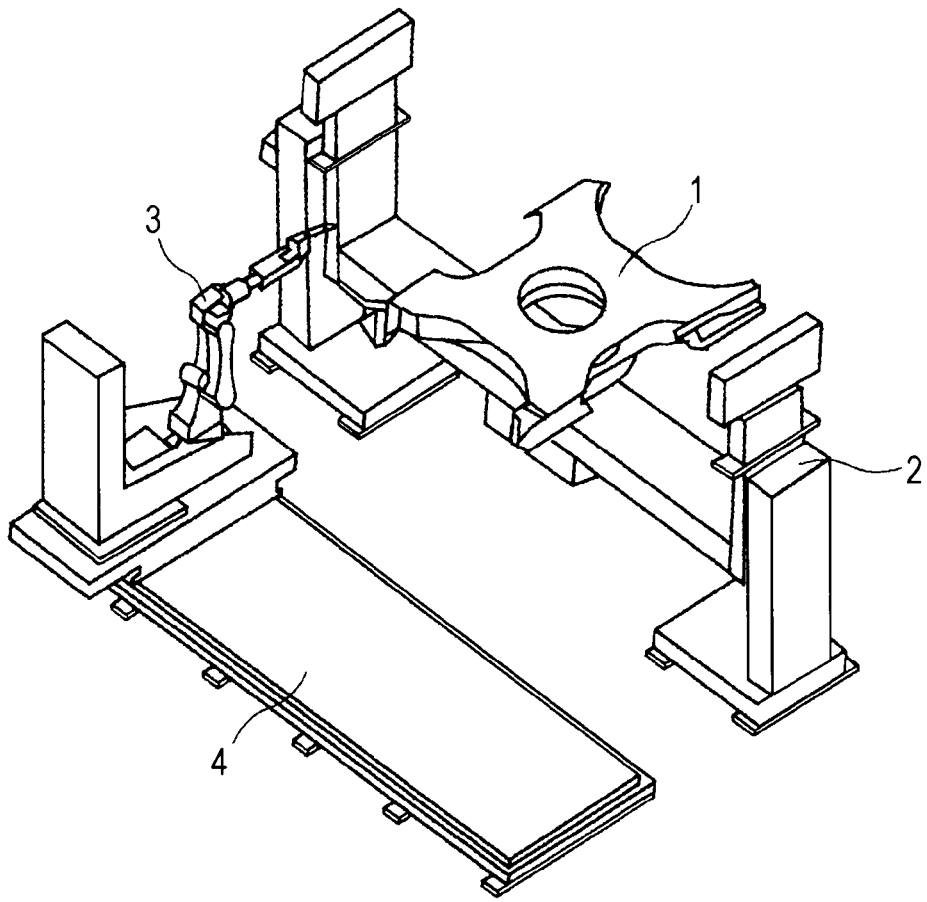
FIG. 23 is a perspective view of a welding system.
Figure 24:
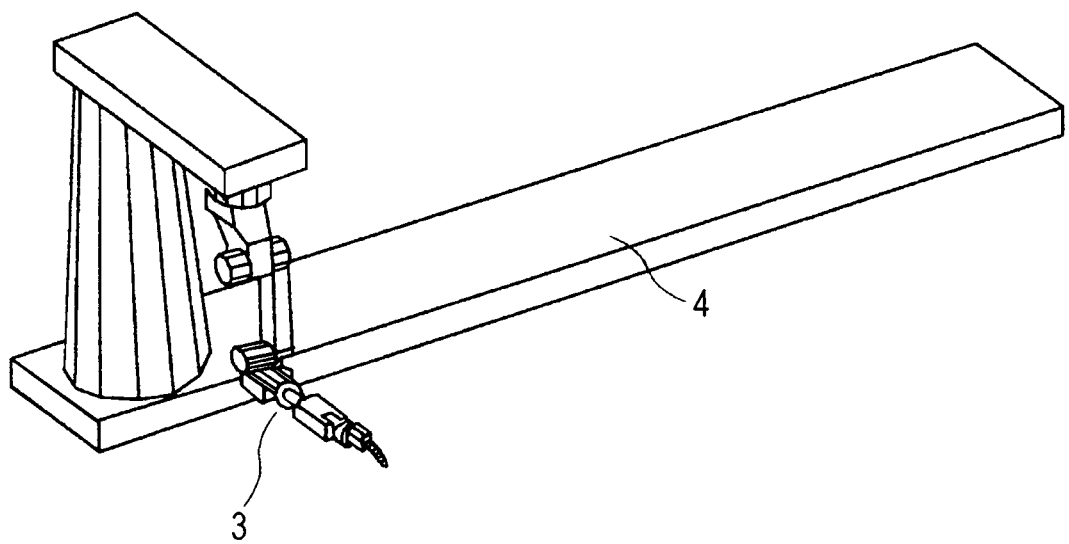
FIG. 24 is a perspective view of a slider including a rotation axis in the related art.
Figure 25:
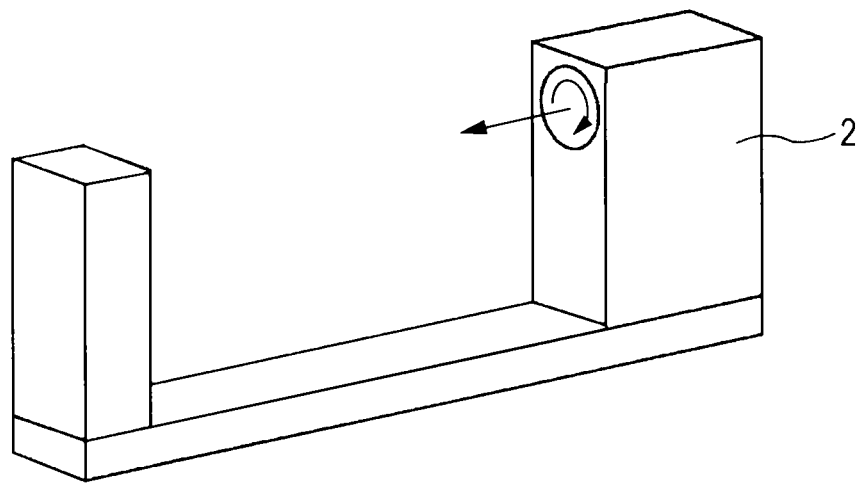
FIG. 25 is a perspective view of a doubly supporting one-axis positioner.
Figure 26:
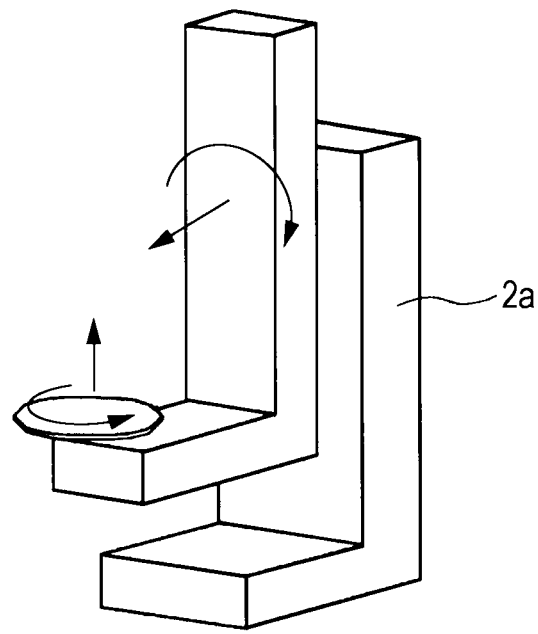
FIG. 26 is a perspective view of a two-axis positioner.
Figure 27:
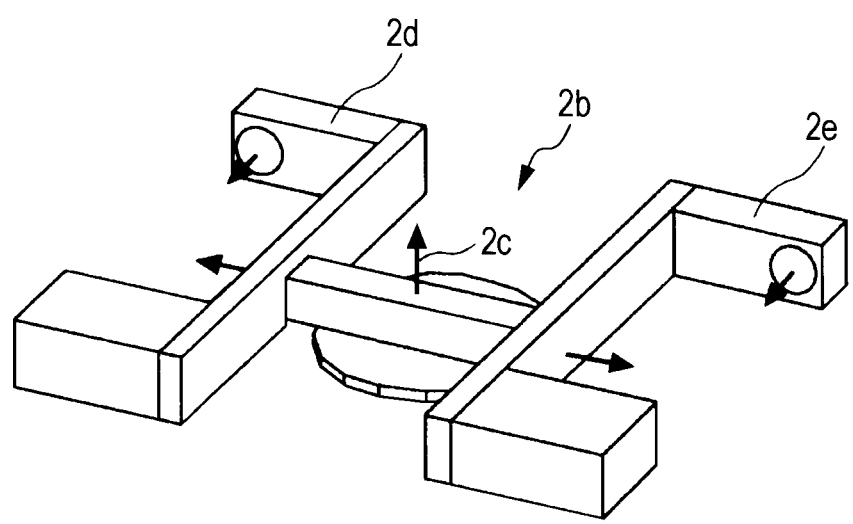
FIG. 27 is a perspective view of a five-axis positioner.

The position and the attitude of the torch and the positions of the positioner and the slider have been determined in the above-described steps. Now, a position command of the robot is to be changed by the program editing and creating unit 23. In the case of a system illustrated in FIG. 23, for example, the position command of the robot includes the position and the attitude of the torch and the positions of the positioner and the slider in particular steps (X, Y, Z, $\alpha$, $\beta$, $\gamma$, Sx, Sy, Sz, P1, and P2). The position command can be changed to one in the previous step or can be added to the previous or next step of a particular step.

The change and the addition of a step are also performed on a step M that has been moved from the current step N, and a program is completed by repeating the change and the addition. That is, when the current step is changed upon an instruction by the operator, the current step coordinates are automatically set. In addition, the change in the step coordinates may be set for all the steps when a program has been read.

Figure 18:
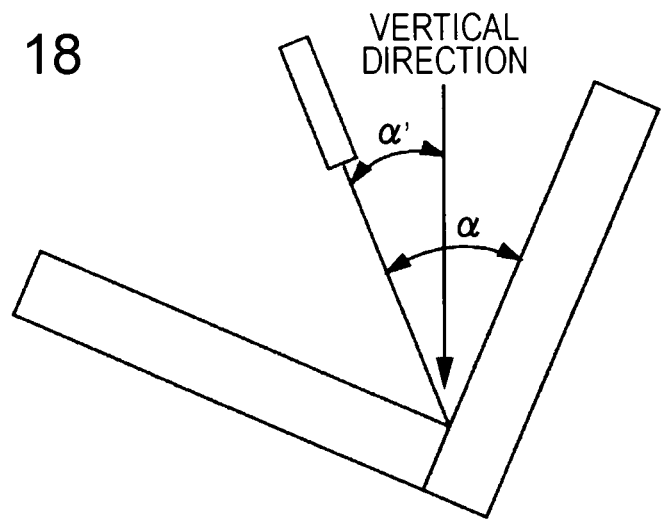
FIG. 18 is a diagram illustrating a method for specifying an angle α of the torch.
Figure 22:
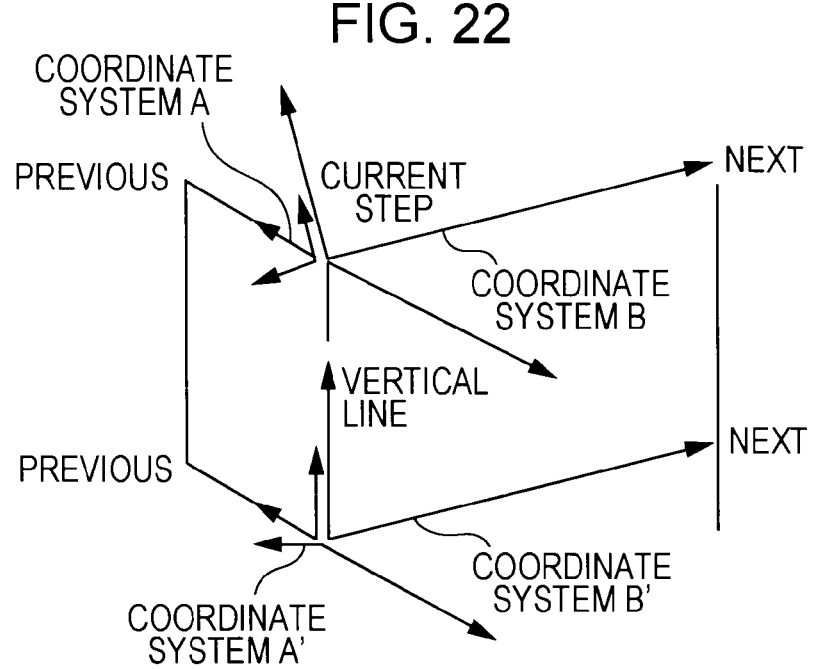
FIG. 22 is a diagram illustrating another weld line model.

It is to be noted that the angles of the torch can be changed as necessary by the operator if the operator inputs values of the angles. As illustrated in FIG. 18, the angle $\alpha$ is an angle of the torch relative to a surface that is perpendicular to the direction of a weld line and specified by the angle α relative to a reference plane (step coordinate axis) or by an angle α' relative to the vertical direction. Similarly, as illustrated in FIG. 19, the angle β is an angle of the torch relative to a surface that includes a weld line and specified by the angle β relative to the step coordinate axis or by an angle β' relative to the vertical direction. In addition, although not illustrated, there is a rotational angle around a material to be welded, and this angle is input as γ. FIG. 20 illustrates an input screen at that time. In the example illustrated in FIG. 20, the indications "vertical relative value", which represent values relative to the vertical direction, are checked, which means that the vertical relative values α' and β' have been input.

There is a case in which, during welding, the angle of a positioner of the step is manually corrected in order to finely adjust the inclination of a weld line. In this case, if remote synchronization has been selected in a user interface illustrated in FIG. 11, the torch moves in synchronization with the rotation of the positioner. The attitude of the torch at this time is determined on the basis of whether or not fixing of the angles of the torch has been selected.

In addition, in order to quantitatively specify the angle of the inclination of a weld line, it is possible to change step data by inputting an angle of the positioner obtained by utilizing the invention of the above-described Japanese Unexamined Patent Application Publication No. 2006-72673 to the present invention.

It is to be noted that the present invention is a technology for guidance along a weld line and therefore air-cut movement from a robot escape position to a welding beginning position is performed by switching the method to an existing guidance method in which the amount of travel of the top of the torch is specified by X, Y, and Z.

A program that has been completed is subjected to an inspection by performing an operation check and a workpiece collision check using a simulation function of the offline teaching system. If no problem has been found in the inspection, the program is transmitted from a personal computer 11 to a controller 12 through a local area network (LAN) cable illustrated in FIG. 31. In addition, an actual robot 13 checks the created program using an actual workpiece and, if no problem has been found, actually discharges arc to check welding.

Figure 28:
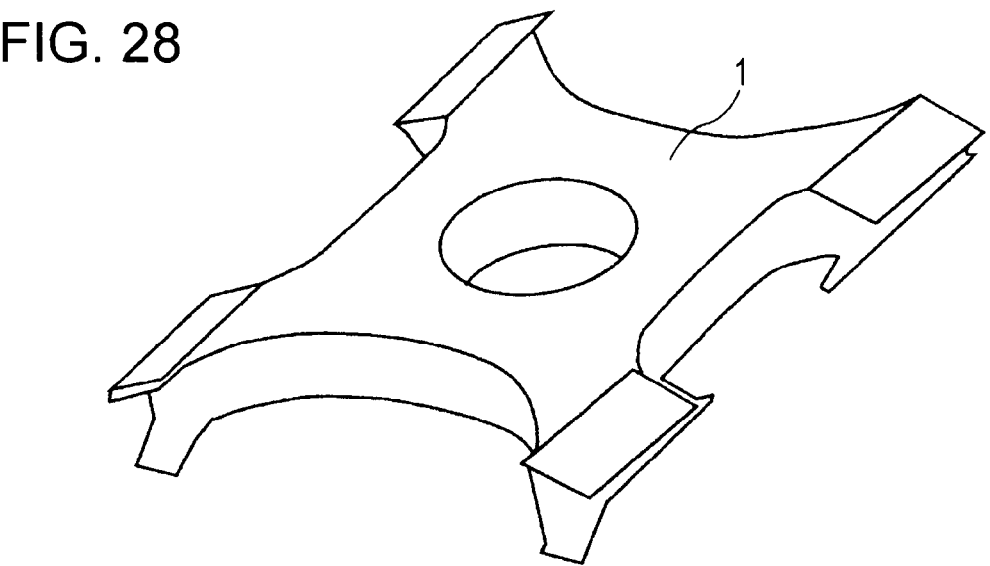
FIG. 28 is a perspective view of an example of a component of a construction machine.
Figure 29:
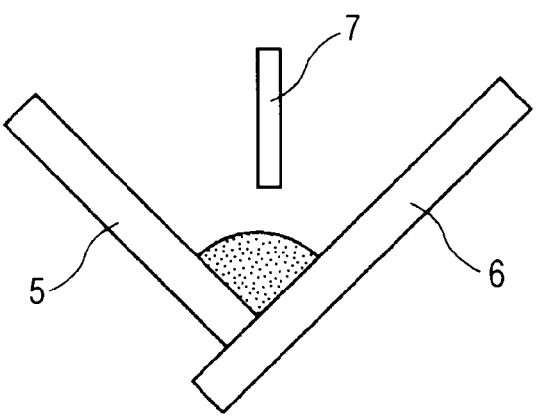
FIG. 29 is a diagram illustrating flat welding.
Figure 30:
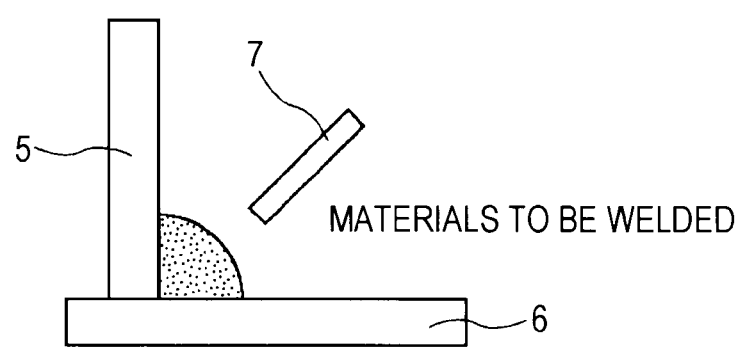
FIG. 30 is a diagram illustrating horizontal fillet welding.

Although a method for guiding a robot in which steps of a program that have been read are regarded as a weld line has been described in the above embodiment, it is possible to perform the same operation by regarding points on a weld line on a workpiece model illustrated in FIG. 28. A workpiece model is a model that includes a face, whereas a weld line model is a model that includes a segment and a welding direction.

Although a robot system for arc welding has been described in the above embodiment, the above embodiment may be applied to a sealing robot, the work line of which is a line. In addition, although the above embodiment relates to offline teaching using the personal computer 11, the same operation can be performed using an apparatus in which the robot program 12 has the same function as the personal computer 11. In addition, if there is no workpiece model, guidance may be performed using artificial coordinate systems A' and B' in which, in the coordinate systems A and B, a coordinate axis in the welding direction is fixed, another coordinate axis is parallel to an X-Y plane, and Z is oriented in the vertical direction. In addition, although the weld line is supposed to be a straight line and/or an arc in the above description, even if there is a spline curve between steps, the same coordinate system as for an arc whose curve direction is C may be defined and used.

What is claimed is:

1. An offline teaching method for performing, on a welding robot, offline teaching of a weld line including a segment, the offline teaching method comprising the steps of:
    obtaining, by a computer, a position of a current step of a torch of the welding robot and a position of a next or a previous step;
    setting, by the computer, either a previous stage coordinate system ranging from the previous step to the current step or a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction;
    inputting, by an operator, an amount of travel in the set coordinate system;
    displaying, by the computer, the torch of the welding robot such that the torch is moved along the weld line in the next stage coordinate system or the previous stage coordinate system by the amount of travel;
    selecting, before the step of obtaining, axes of a slider and a positioner on which peripheral coordination is to be performed;
    inputting, by the operator, either absence of peripheral axis coordination in the step of inputting the amount of travel or presence of peripheral axis coordination in the step of inputting the amount of travel, and either the attitude of the torch is to be fixed or the attitude of the torch is not to be fixed; and
    moving, if the peripheral axis coordination is to be performed, at least either the slider or the positioner by an amount proportional to the amount of travel of the torch relative to the position of the next step,
    wherein, if the torch is to be fixed, an angle of the torch is kept the same relative to a positioner setting surface in the coordinate system by setting an angle obtained by subtracting an amount of rotation of the positioner as the angle of the torch, and, if the torch is not to be fixed, the angle of the torch is not changed in the coordinate system.

2. An offline teaching method for performing, on a welding robot, offline teaching of a weld line divided into a plurality of segments by steps, the offline teaching method comprising the steps of:
    obtaining, by a computer, a position of a current step of a torch of the welding robot and positions of next and previous steps in order to allow the torch of the welding robot to move along a previous segment or a next segment;
    setting, by the computer, a previous stage coordinate system ranging from the previous step to the current step and a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction or, if the segment of the weld line is an arc, an XCZ coordinate system in which a radial direction of the arc is an X direction, a circumferential direction of the arc is a C direction, and a direction perpendicular to a base material to be welded is a Z direction;

inputting, by an operator, an amount of travel in the set coordinate system;

displaying, by the computer, the torch of the welding robot such that the torch is moved along the weld line in the next stage coordinate system or the previous stage coordinate system by the amount of travel;

selecting, before the step of obtaining, axes of a slider and a positioner on which peripheral coordination is to be performed;

inputting, by the operator, either absence of peripheral axis coordination in the step of inputting the amount of travel or presence of peripheral axis coordination in the step of inputting the amount of travel, and either the attitude of the torch is to be fixed or the attitude of the torch is not to be fixed; and moving, if the peripheral axis coordination is to be performed, at least either the slider or the positioner by an amount proportional to the amount of travel of the torch relative to the position of the next step, wherein, if the torch is to be fixed, an angle of the torch is kept the same relative to a positioner setting surface in the coordinate system by setting an angle obtained by subtracting an amount of rotation of the positioner as the angle of the torch, and, if the torch is not to be fixed, the angle of the torch is not changed in the coordinate system.

3. The offline teaching method according to claim 2, wherein, if the amount of travel input by the operator has a negative value, the previous stage coordinate system is automatically selected by the computer and, if the amount of travel has a positive value, the next stage coordinate system is automatically selected by the computer.

4. An offline teaching method for performing, on a welding robot, offline teaching of a weld line divided into a plurality of segments by steps, the offline teaching method comprising the steps of:

obtaining, by a computer, a position of a current step of a torch of the welding robot and positions of next and previous steps in order to allow the torch of the welding robot to move along a previous segment or a next segment; setting, by the computer, a previous stage coordinate system ranging from the previous step to the current step and a next stage coordinate system ranging from the current step to the next step by using, if the segment of the weld line is a straight line, an XYZ coordinate system in which a direction of the weld line is a Y direction and a direction perpendicular to a surface of a base material to be welded is a Z direction or, if the segment of the weld line is an arc, an XCZ coordinate system in which a radial direction of the arc is an X direction, a circumferential direction of the arc is a C direction, and a direction perpendicular to a base material to be welded is a Z direction;

inputting, by an operator, an amount of travel in the set coordinate system;

displaying, by the computer using a coordinate system selected by an instruction from the operator, the torch of the welding robot such that the torch is moved along the weld line in the next stage coordinate system or the previous stage coordinate system by the amount of travel;

selecting, before the step of obtaining, axes of a slider and a positioner on which peripheral coordination is to be performed;

inputting, by the operator, either absence of peripheral axis coordination in the step of inputting the amount of travel or presence of peripheral axis coordination in the step of inputting the amount of travel, and either the attitude of the torch is to be fixed or the attitude of the torch is not to be fixed; and moving, if the peripheral axis coordination is to be performed, at least either the slider or the positioner by an amount proportional to the amount of travel of the torch in relation to the position of the next step, wherein, if the torch is to be fixed, an angle of the torch is kept the same relative to a positioner setting surface in the coordinate system by setting an angle obtained by subtracting an amount of rotation of the positioner as the angle of the torch, and, if the torch is not to be fixed, the angle of the torch is not changed in the coordinate system.

5. The offline teaching method according to claim 4, further comprising the step of:

changing, by the operator, an angle of the torch in the previous stage coordinate system or the next stage coordinate system.

* * * * *